United States Patent
Cioarga et al.

(10) Patent No.: US 11,635,932 B2
(45) Date of Patent: Apr. 25, 2023

(54) LOCATION RESPONSIVE INDIVIDUALIZED VISUAL INTERFACE METHOD AND SYSTEM

(71) Applicant: Everseen Limited, Blackpool (IE)

(72) Inventors: Razvan-Dorel Cioarga, Oradea (RO); Joe Allen, Ballybunion (IE); Raymond Hegarty, Dublin (IE); Ana Cristina Todoran, Arad (RO); Adrian Fit, Timisoara (RO)

(73) Assignee: Everseen Limited, Blackpool (IE)

( * ) Notice: Subject to any disclaimer, the term of this patent is extended or adjusted under 35 U.S.C. 154(b) by 20 days.

(21) Appl. No.: 17/330,850

(22) Filed: May 26, 2021

(65) Prior Publication Data
US 2022/0382504 A1 Dec. 1, 2022

(51) Int. Cl.
| | |
|---|---|
| *G06F 3/14* | (2006.01) |
| *G06F 3/01* | (2006.01) |
| *G06F 3/16* | (2006.01) |
| *G06Q 30/0601* | (2023.01) |
| *G06Q 50/12* | (2012.01) |

(52) U.S. Cl.
CPC ............ *G06F 3/1446* (2013.01); *G06F 3/017* (2013.01); *G06F 3/167* (2013.01); *G06Q 30/0641* (2013.01); *G06Q 50/12* (2013.01)

(58) Field of Classification Search
CPC ........ G06F 3/1446; G06F 3/1454; G06F 3/01; G06F 3/005; G06F 3/016; G06F 3/017; G06F 3/167; G06F 3/147; G06Q 30/0641; G06Q 50/12; G09G 5/38; G09G 2340/0464; G09G 2354/00
See application file for complete search history.

(56) References Cited

U.S. PATENT DOCUMENTS

| | | | |
|---|---|---|---|
| 8,123,130 B2 * | 2/2012 | Pentel | G06Q 20/204 |
| | | | 235/472.01 |
| 9,640,041 B2 * | 5/2017 | Block | G07F 19/201 |
| 10,311,530 B2 * | 6/2019 | Becker | G06Q 20/18 |
| 10,600,041 B2 * | 3/2020 | Kelly | G06Q 20/18 |
| 2016/0240050 A1 * | 8/2016 | Block | G06Q 20/1085 |
| 2022/0245714 A1 * | 8/2022 | O'Herlihy | G06Q 20/12 |

OTHER PUBLICATIONS

He, Kaiming, et al., "Deep Residual Learning for Image Recognition," IEEE Conference on Computer Vision and Pattern Recognition (CVPR), Las Vegas, NV, 2016, pp. 770-778.

(Continued)

*Primary Examiner* — Vijay Shankar
(74) *Attorney, Agent, or Firm* — Young Basile Hanlon & MacFarlane, P.C.

(57) ABSTRACT

The present disclosure relates to a method of displaying visual information to a user that includes tracking a location of the user within a pre-defined region, determining a current display screen from a plurality of display screens installed in the pre-defined region, based on current user location, determining a current display position on the current display screen based on the current user location, wherein the current display position is at a pre-defined distance from the current user location, and displaying the visual information on the current display position.

18 Claims, 11 Drawing Sheets

(56) References Cited

OTHER PUBLICATIONS

Huang, Gao, et al., "Densely Connected Convolutional Networks," 2017 IEEE Conference on Computer Vision and Pattern Recognition (CVPR), Honolulu, HI, USA, 2017, pp. 2261-2269.

Tan, Mingxing, et al., "EfficientDet: Scalable and Efficient Object Detection," 2020 IEEE/CVF Conference on Computer Vision and Pattern Recognition (CVPR), Seattle, WA, USA, 2020, pp. 10778-10787.

Lin, Tsung-Yi, et al., "Focal Loss for Dense Object Detection," IEEE Transactions on Pattern Analysis and Machine Intelligence, (2020) 42, 318-327.

Deng, Jiankang, et al., "RetinaFace: Single-stage Dense Face Localisation in the Wild," Proceedings of the IEEE/CVF Conference on Computer Vision and Pattern Recognition (CVPR), 2020, pp. 5203-5212.

Bochkovskiy, Alexey, et al., "YOLOv4: Optimal Speed and Accuracy of Object Detection," Apr. 23, 2020, pp. 1-17.

\* cited by examiner

LOCATION RESPONSIVE INDIVIDUALIZED VISUAL INTERFACE METHOD AND SYSTEM

TECHNOLOGY FIELD

The present disclosure relates to a location responsive individualized visual interface method and system, and more specifically to providing visual information to users based on their location.

BACKGROUND

In the wake of Covid-19, social distancing has become an essential component in the armoury to stop the spread of the disease. In customer-facing services, the isolation of customers from other customers and staff members is especially important. For example, while drive-through restaurant lanes have been used for decades as a driver of sales at fast food chains, demand for such facilities has recently increased as pandemic restriction measures have forced the closure of indoor dining restaurants. A drive-through restaurant uses customer vehicles and their ordered progression along a road to effectively isolate customers from each other. The advantages of the drive-through model has seen its adoption by many other sectors over the years including drive-through parcel centres, grocery stores etc.

Slow service and long queues are a significant customer deterrent in a drive-through facility. However, the throughput of any sequential linear service system is inherently limited by the speed of the slowest service access operation. One way of solving this problem is to provide parallel access channels, spreading access request traffic across the multiple access channels so that a particularly slow access request in one channel does not impact the throughput of the other channels. In the case of a drive-through facility, multiple access channels are represented by multiple service lanes into which individual vehicles can queue, so that the occupants of several vehicles can be served at the same time. However, parallel access channel systems have a significantly larger footprint than sequential linear systems. Where space is plentiful, the larger footprint of parallel access channel systems is not problematic and such systems are a useful way of increasing throughput. However, in environments where space is less available (and/or real estate is costly), alternative approaches must be adopted to increase throughput.

One way of overcoming this problem is a non-sequential unilinear multi-carrier system which enables several contemporaneous, and substantially independent interactions to be conducted with the members of a single queue. In many cases, a carrier is a device which is electrically and/or mechanically movable (along a rail for example) to a queued vehicle to undertake a transaction with the occupants thereof. However, the reliance on electro-mechanical movement of carrier devices has several disadvantages. One major disadvantage is mechanical wear and tear associated with any moving part, thereby necessitating ongoing maintenance. Another major disadvantage is challenges in coordinating the movements of carrier devices to address asynchronous, non-sequential, transactions of variable durations (especially if the movements of the carrier devices are physically constrained along a shared rail) to prevent the carrier devices from colliding and to allow individual carrier devices to pass around other occupied carrier devices to reach an incoming vehicle. Yet another major disadvantage is limitations on the design of the user interface caused by the fixed physical dimensions of the carrier device, and safety hazards where a moving carrier device may hit somebody, or body parts may be caught in the rail (or other medium) for moving the carrier devices.

In view of the above, there is a need to provide a system that overcome the challenges caused by a misalignment of the physical sequencing of a carrier device on a shared rail with variable duration order-taking processes with an individual customer.

SUMMARY

This summary is provided to introduce a selection of concepts, in a simple manner, which are further described in detailed description. This summary is neither intended to identify the key or essential inventive concept of the subject matter, nor to determine the scope of the disclosure.

In an embodiment of the present disclosure, there is provided a method of displaying visual information to a user. The method includes tracking a location of the user within a pre-defined region, determining a current display screen from a plurality of display screens installed in the pre-defined region, based on current user location, determining a current display position on the current display screen based on the current user location, wherein the current display position is at a pre-defined distance from the current user location, and displaying the visual information on the current display position.

In another embodiment of the present disclosure, there is provided a visual user interface system, that includes a screen system comprising a plurality of display screens installed along, within or upon a pre-defined region, a sensor system, comprising at least one of: a plurality of video cameras, a plurality of audio sensors, and a plurality of proximity sensors, and a processing system communicatively coupled to the screen system, and the sensor system. The processing system is configured to detect a user in the pre-defined region based on signals received by the sensor system, track a location of the user within the pre-defined region, determine a current display screen of the screen system, determine a current display position on the current display screen based on the current user location, wherein the current display position is at a pre-defined distance from the current user location, display a visual user interface on the current display position, and move the visual user interface across the plurality of display screens to follow movement of the user.

In yet another embodiment of the present disclosure, there is provided a non-transitory computer readable medium configured to store a program causing a computer to display visual information to a user. The program is configured to detect a user in a pre-defined region based on signals received by the sensor system, track a location of the user within the pre-defined region, determine a current display screen of the screen system, determine a current display position on the current display screen based on the current user location, wherein the current display position is at a pre-defined distance from the current user location, display a visual user interface on the current display position, and move the visual user interface across the plurality of display screens to follow movement of the user.

Various embodiments of the present disclosure provide a visual interface operable to detect the location and movements of each of one or more customers arranged in a queue, present visual information to the or each of the customers at the location(s) or moving location(s) thereof and optionally receive requests from the or each of the customers at the location(s) or moving location(s) thereof.

In one use case, the system is operable in a drive through facility to detect the location and movement of vehicles therein and adapt to the diversity of shapes and sizes of said vehicles to present menu options to occupants of a vehicle at positions convenient for viewing or access by the occupants. In another use case, the system is operable in other environments of substantially linear travel, for example to present information to individuals on a moving walkway ("travelator"), inclined moving walkway or beside an escalator.

The general field of the disclosure is a visual interface adapted to display information to (and potentially to receive information from) each of one or more individuals arranged at potentially different locations in a fixed or moving queued arrangement. The visual user interface is adapted to present the information at the location (or moving location) of an individual on a visual display medium such as a display screen disposed within a pre-defined distance of the individual. The visual user interface is further adapted to present information to an individual at a point ahead of their current location(s) along their direction of travel, to lead the individual to a next position. Accordingly, the visual user interface is adapted to deliver real-time vertical and horizontal movements of the presented information to accommodate variations in the heights and movement trajectories of different users.

In this manner, the challenges caused by a misalignment of the physical sequencing of customer engagement devices on a shared rail with variable duration order-taking processes with an individual customer is avoided. Specifically, service to individual customers in a queue is no longer limited by the speed of taking the slowest or most complex order. Instead, customers with shorter/simpler orders may have their order taken quickly without a dependency on the speed of order-taking from customers further ahead of them in the queue. Similarly, the visual user interface of the present invention enables spatially independent and effectively cellular order-taking processes to be taken without the physical sequencing constraints imposed by a shared mechanical rail system.

Further benefits, goals and features of the present invention will be described by the following specification of the attached figures, in which components of the embodiments are exemplarily illustrated. Components of the devices and method according to the disclosure, which match at least essentially with respect to their function, can be marked with the same reference sign, wherein such components do not have to be marked or described in all figures.

The disclosure is just exemplarily described with respect to the attached figures in the following.

BRIEF DESCRIPTION OF DRAWINGS

The embodiments will be described and explained with additional specificity and detail with the accompanying figures in which.

Furthermore, the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

It will be understood by those skilled in the art that the foregoing general description and the following detailed description are exemplary and explanatory of the embodiments and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

Embodiments of the present disclosure will be described below in detail with reference to the accompanying figures.

Figure 1:
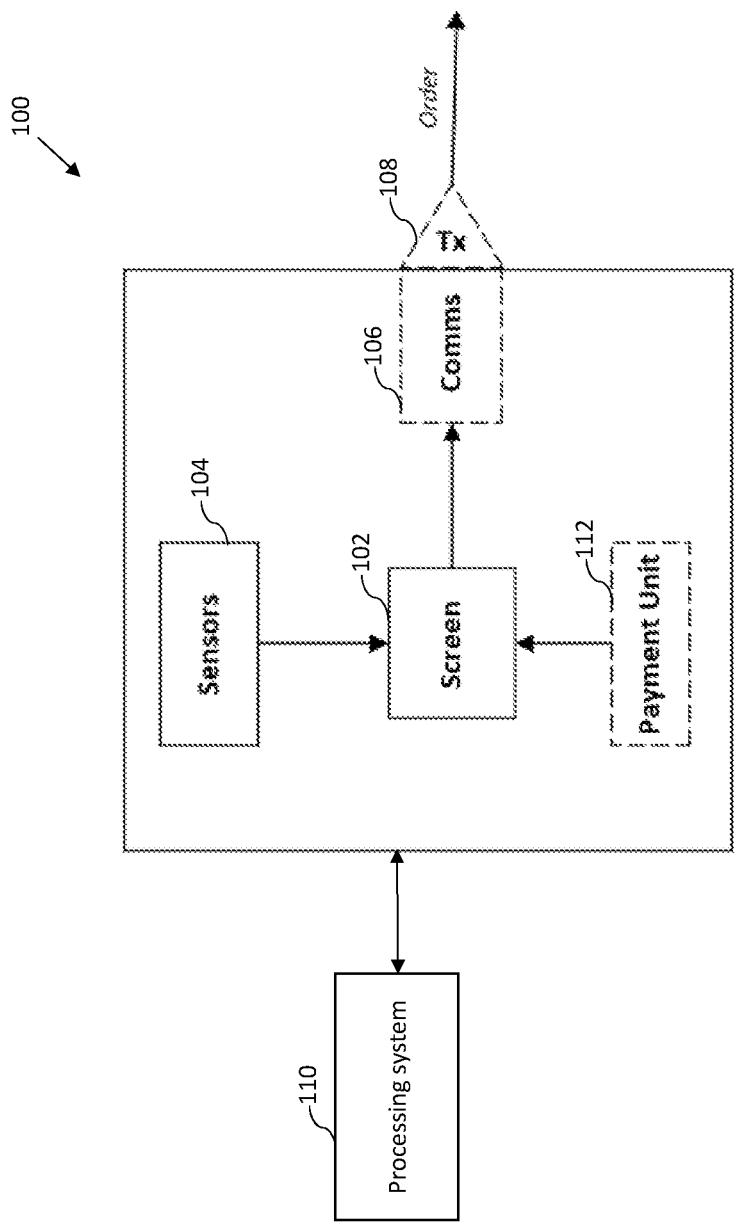
FIG. 1 is a block diagram of a Visual Interface System, in accordance with an embodiment of the present disclosure.

FIG. 1 is a block diagram of a visual interface system 100, in accordance with an embodiment of the present disclosure.

The visual interface system 100 includes a screen system 102 including a plurality of display screens installed along a pre-defined path, a sensor system 104 including at least one of: a plurality of video cameras, a plurality of audio sensors, and a plurality of proximity sensors, and a processing system 110 communicatively coupled to the screen system 102, and the sensor system 109. The processing system 110 is configured to detect a user in the pre-defined path based on signals received by the sensor system 104, track a location of the user along the pre-defined path, determine a current display screen of the screen system, determine a current display position on the current display screen based on the current user location, wherein the current display position is at a pre-defined distance from the current user location, display a visual user interface on the current display position, and move the visual user interface across the plurality of display screens to follow movement of the user.

The visual interface system 100 enables the display of content on each display screen at a position within a pre-defined distance of a person present in the pre-defined path such as an interaction region. The content may comprise personalized or interactive elements. The visual interface system 100 may follow the movements of the person as they progress along or within the interaction region.

In one use case scenario, the visual interface system 100 includes a plurality of functionally integrated hardware and software components to support automatic order taking and payment receipt from one or more customers in a drive-through environment. Specifically, the visual interface system 100 supports an automated order taking system, adaptive to the movements and dimensions of customer vehicles to provide a more physically effective engagement with the occupants thereof. Additionally, the visual interface system 100 supports substantially simultaneous order-taking from a plurality of customers in a sequential linear queuing system, using a plurality of substantially independently-movable simultaneously-operable visual user interfaces. The visual interface system is also operable for several other use case scenarios, including, for example the provision of individualized moving user interfaces to persons on a moving walkway or an escalator.

The description of the hardware and software components of the visual interface system 100 is focused on the drive-through restaurant use case scenario. However, it will be understood that the hardware and software components of the visual interface system 100 may be configured differently for the other use cases thereof. For example, for safety, it may not be advisable for the visual interface system 100 to act as an order taking system for passengers on an escalator, which might require the passengers to remove their hands from the escalator's handrail. Thus, the order selection and payment aspects of the visual interface system 100 may be removed therefrom in the escalator use case scenario.

The screen system 102 is communicatively coupled with the sensor system 104 and the communications unit 106 through either or both of a wired or a wireless communication network. The screen system 102 may include one or more computer monitors or display screens that run along a length of the pre-defined path, i.e. the interaction region. Examples of the display screen include, but are not limited to a flat screen or curved LCD, LED, OLED, and projection TV screen. The sensor system 104 may include one or more video sensors (e.g. video camera), one or more audio sensors (e.g. a microphone) and one or more proximity sensors. The skilled person will understand that these sensors are mentioned for example purposes only. In particular, the skilled person will understand that the visual interface system 100 of the present disclosure is not limited to the use of the above-mentioned sensors. In particular, the visual interface system 100 of the present disclosure is operable with any combination of sensors which permit detection of the presence of a nearby object and the location thereof, and/or permit detection of features of the object sufficient to enable classification thereof, and/or permit detection of utterances or gestures made by a user of the visual interface system 100. In an embodiment of the present disclosure, the sensor system 104 may be mountable on the screen system 102. Alternatively or additionally, the sensor system 104 may be mountable elsewhere in an environment where the visual interface system 100 is being used, for example, a drive-through facility. Alternatively or additionally, the sensor system 104 may be within a pre-defined distance from the screen system 102 thereof.

The communications unit 106 may include an antenna unit (not shown) to permit communication with a remotely located cell phone or another wireless device. The communications unit 106 may also include a speaker (not shown) adapted to issue an audible message to a customer. The communications unit 106 may also include a transmitter unit 108 communicatively coupled with a corresponding receiver unit (not shown) in a backend operational unit (not shown) to transmit an order received from the customer to the backend operational unit (not shown).

The visual interface system 100 may further include a payment unit 112 which may include one or more payment devices comprising any of a contact-based card reader unit (for example, a magnetic stripe card reader), a contactless card reader unit (for example, a smart card reader) or a combination of both. Alternatively, the payment devices may comprise a radio frequency tag reader or a near field communication enabled reader device (e.g. radio frequency tag reader or a near field tag reader capable of reading smart fobs, smart cards, cell phones or other wireless devices to receive payment therefrom). The payment device(s) may be communicatively coupled with a multiplexer unit (not shown) which is adapted to multiplex the signals received from the payment device(s). The multiplexer unit (not shown) may be communicatively coupled with a Billing/Payment Module of the software components of the visual interface system 100 described below. Specifically, depending on the orders being processed by the visual interface system 100, the multiplexer unit (not shown) may be adapted to transmit to the billing/payment module, confirmation of receipt of payment for a corresponding order.

In an embodiment of the present disclosure, the screen system 102, the sensor system 104, the communication unit 106, and the payment unit 112 are hardware components that are controlled and managed by a processing system 110. The processing system 110 includes various software components to control and manage the hardware components therein. The processing system 110 may represent a computational platform that includes components that may be in a server or another computer system, and execute, by way of a processor (e.g., a single or multiple processors) or other hardware described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The processing system 110 may include a processor that executes software instructions or code stored on a non-transitory computer-readable storage medium to perform method and functions that are consistent with that of the present disclosure. In an example, the processing system 110 may be embodied as a Central Processing Unit (CPU) having one or more Graphics Processing Units (GPUs) executing these software codes.

Figure 2:
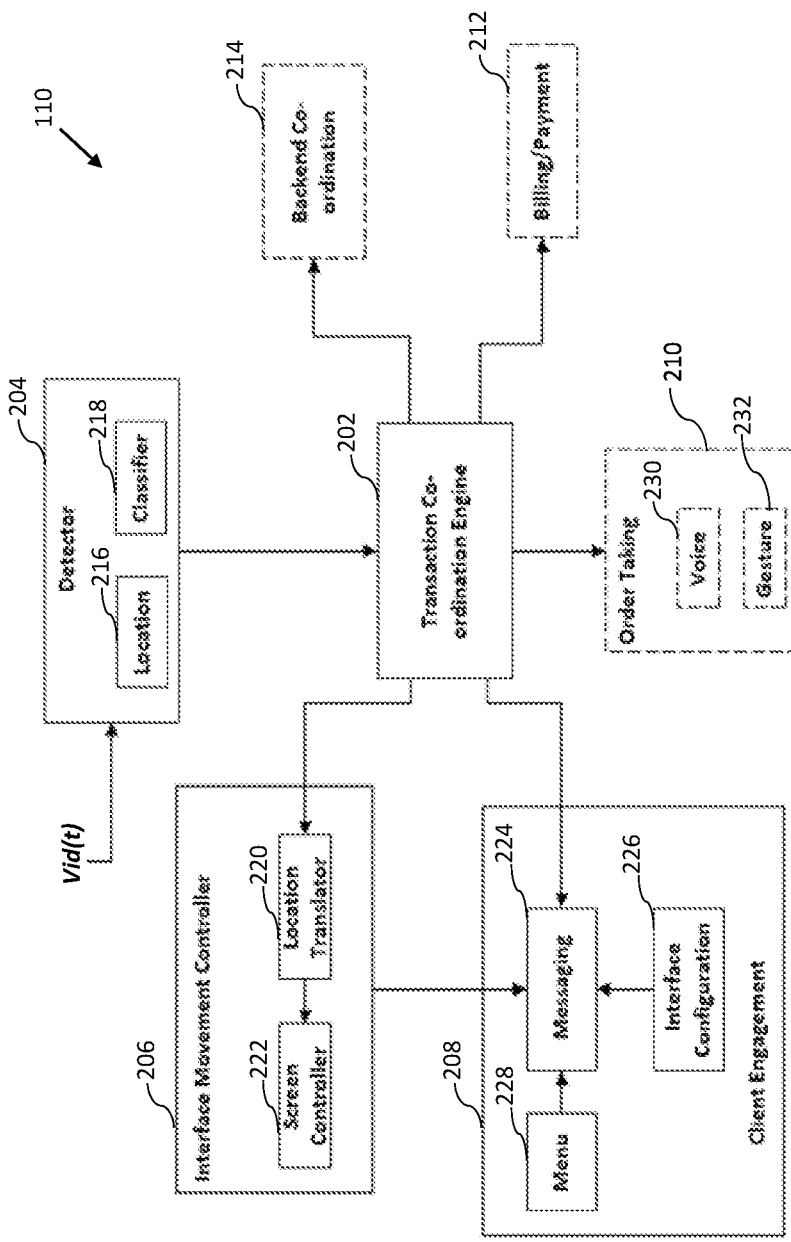
FIG. 2 is a block diagram of a processing system of FIG. 1, in accordance with an embodiment of the present disclosure.

FIG. 2 is a block diagram of the processing system 110, in accordance with an embodiment of the present disclosure. The processing system 110 includes a Transaction Co-ordination Engine 202 communicatively coupled with a Detector Unit 204, an Interface Movement Controller 206, a Client Engagement Module 208, an Order Taking Module 210, a Billing/Payment Module 212, and a Backend Co-ordination Engine 214. The Transaction Co-ordination Engine 202 is configured to co-ordinate the activities of the Detector Unit 204, the Interface Movement Controller 206, the Client Engagement Module 208, the order taking module 210, the Billing/Payment Module 212, and the Backend Co-ordination Engine 214.

The Detector Unit 204 is configured to receive and process signal(s) from the sensor system 104 shown in FIG. 1. In an embodiment of the present disclosure, the Detector Unit 204 is configured to receive and fuse video footage (vid(t)) captured by one or more of video camera members of the sensor system 104. In another embodiment of the present disclosure, the Detector Unit 204 is configured to receive and fuse video footage (vid(t)) captured by the video camera(s) with output signals from proximity sensors(s) to establish a multi-sensor view of an observed region. The Detector Unit 204 includes an object location module 216 which is configured to receive signal(s) from the sensor system 104. The object location module 216 is configured to use an object detector algorithm to detect, from the signal(s), the presence of an object (not shown) within a pre-defined distance of the screen system 102 shown in FIG. 1, and to determine the location of the detected object in relation to the screen system 102. In an example, the object location module 216 may be adapted to determine a vertical and/or horizontal distance between a centroid of the detected object and the centroid of the screen system 102. In one embodiment, the location of a detected object is represented by the co-ordinates of a bounding box which is configured to enclose the object. The co-ordinates of the bounding box are established with respect to the co-ordinate system of a video frame received from a video camera member of the sensor system 104. In this case, the object location module 216 is configured to use pre-configured information regarding the physical dimensions and layout of the video camera(s) relative to the screen system 102 to translate the co-ordinates of the bounding box enclosing a detected object into horizontal and/or vertical distance measurements from the screen system 102.

In an embodiment of the present disclosure, the object detector algorithm may include the RetinaNet algorithm (as described in T.-Y. Lin, P. Goyal, R. Girshick, K. he and P Dollar, Focal Loss for Dense Object Detection, IEEE Transactions on Pattern Analysis and Machine Intelligence, (2020) 42, 318-327), YOLOv4 (as described in A Bochkovskiy, C-Y Wang and H-Y M Liao, 2020 arXiv: 2004.10934) or the EfficientDet (as described in M. Tan, R. Pang and Q. V. Le, EfficientDet: Scalable and Efficient Object Detection, 2020 *IEEE/CVF Conference on Computer Vision and Pattern Recognition (CVPR)*, Seattle, Wash., USA, 2020, pp. 10778-10787. The skilled person will understand that the above-mentioned object detector algorithms are provided for example purposes only. In particular, the skilled person will understand that the present embodiment is not limited to the above-mentioned object-detection algorithms. Instead, the present embodiment is operable with any object detection algorithm capable of detecting the presence of an object and determining its location in a video frame.

In an embodiment of the present disclosure, the Detector Unit 204 includes an object classifier module 218 which is adapted to use an object classification algorithm to recognize and classify the detected object in one of predefined classes. Examples of pre-defined classes include, but are not limited to: car, truck, motorcycle, bicycle, van and person. The skilled person will understand that the above-mentioned object classes are provided for example purposes only. In particular, the skilled person will understand that the present embodiment is not limited to the detection of objects of the above-mentioned classes. Instead, the present embodiment is adaptable to determine the classification of any movable object that is detectable in a video frame. In an example, the object classification algorithm may include a ResNet-101 convolutional neural network (as described in He K., Zhang X., Ren S. and Sun J. "Deep Residual Learning for Image Recognition", *IEEE Conference on Computer Vision and Pattern Recognition (CVPR)*, Las Vegas, Nev., 2016, pp. 770-778) or a DenseNet (as described in G. Huang, Z. Liu, L. Van Der Maaten and K. Q. Weinberger, Densely Connected Convolutional Networks 2017 *IEEE Conference on Computer Vision and Pattern Recognition (CVPR)*, Honolulu, Hi., USA. 2017, pp. 2261-2269). The skilled person will understand that the above-mentioned object classification algorithms are provided for example purposes only. In particular, the skilled person will understand that the present embodiment is not limited to the above-mentioned object classification algorithms. Instead, the present embodiment is operable with any object classification algorithm capable of classifying an object detected within the field of view (FoV)/sensing range of video camera and/or other sensor types including proximity sensor members of the sensor system 104.

The Detector Unit 204 may use the classification of the detected object to establish whether the detected object is an object of interest. In an example, the classification may be used to detect whether the object is a customer, or a movable object other than a human being, for example, a cat, that might appear in the Field of View of a video camera. In this way, a visual user interface is displayed on the screen system 102 only in the event a customer or a vehicle is detected within a pre-defined distance of the screen system 102, thereby preventing unnecessary disturbances or changes in a current display on the screen system 102.

Alternatively, or additionally, the Detector Unit 204 may include a vehicle dimensions database (not shown) that includes a plurality of vehicle class records. Each vehicle class record includes details of the overall dimensions of vehicle of corresponding class. The object classifier module 218 may classify the detected object as a vehicle, and retrieve a substantially matching record from the vehicle dimensions database to determine the location of the driver's window or the front passenger's window of the detected vehicle. In an embodiment, the object classifier module 218 may be replaced with a driver detection module, which may be configured to detect a location of the driver of a detected vehicle. The location of the driver may be used to establish a more refined estimate of the location of the occupant of the vehicle relative to the screen system 102.

The object classifier module 218 may be further configured to recognize a part of a detected vehicle, for example, a wing mirror of the vehicle, assuming that an object may be at least partly occluded in a video frame. In such case, the Detector Unit 204 may include a vehicle parts dimensions database (not shown) which includes details of geometric relationships between different parts of a vehicle. The geometric relationships enable calculation of horizontal and/or vertical distances between a part of the detected vehicle and the driver's window or the front-passengers window thereof. This distance may be treated as an offset factor to be applied to the detected distance between the detected part of the vehicle and the screen system 102, to permit positioning of a visual user interface on the screen system 102 to enhance its viewability by the user.

Alternatively or additionally, the object location module 216 may be coupled with a face detection module (not shown) that implements a face detection algorithm to detect the presence and determine the location of a face in a video frame. Examples of the face detection algorithm include a RetinaFace architecture as described in J. Deng, J Guo, E. Ververas, I Kotsia and S Zafeirious, *RetinaFace: Single-stage Dense Face Localisation in the Wild*, Proceedings of the IEEE/CVF Conference on Computer Vision and Pattern Recognition (CVPR), 2020, pp. 5203-5212). For brevity, the location of a detected object, or the location of the windows of a detected vehicle or the location of a detected face will be referred to henceforth as a target location. The Detector Unit 204 provides the target location to the Transaction Co-ordination Engine 202.

The Interface Movement Controller 206 is configured to receive the target location relative to the screen system 102 from the Transaction Co-ordination Engine 202. The Interface Movement Controller 206 is configured to display a visual user interface on the screen system 102 at a position located within pre-defined distance of the target location. This may be of particular benefit where the dimensions of the visual user interface are small compared to those of the screen system 102, to ensure optimal positioning of the visual user interface for readability by the respective user.

The Interface Movement Controller 206 includes a Location Translator Module 220 that is communicatively coupled with a Screen Controller Module 222, that is further coupled to the screen system 102. The Location Translator Module 220 includes one or more geometric translation algorithms (not shown) configured to translate the target location into a set of display co-ordinates. In an example, when the screen system 102 includes a plurality of coupled display screens (including computer monitors and/or TV screens), the set of display co-ordinates includes an identifier of the display screen disposed closest to the target location, and the co-ordinates of a display position on the corresponding display screen. The display position on the corresponding display screen is within a pre-defined distance of the target location. The Location Translator Module 220 transmits the display co-ordinates to the Screen Controller Module 222. The screen controller module 222 causes the screen system 102 or a member thereof to become activated at the specified display co-ordinates. The activation of the display screen at the specified display co-ordinates enable more useful positioning of a visual user interface on the screen system 102 to improve its accessibility to the occupant of the vehicle.

The Client Engagement Module 208 includes a Messaging Module 224, an Interface Configuration Module 226 and a Menu module 228. The Messaging Module 224 is communicatively coupled with the Location Translator Module 220 to receive the display co-ordinates corresponding to a position on the screen system 102 disposed within a pre-defined distance of the target location. The Messaging Module 224 is further communicatively coupled with the Interface Configuration Module 226 to receive therefrom the narrative rule(s) and/or visual interface configuration rules. The Messaging Module 224 is further communicatively coupled with the menu module 228 to receive details all the food products available from a drive through restaurant.

In an embodiment of the present disclosure, the Interface Configuration Module 226 may include narrative rules (not shown) pre-configured by the system operators, wherein each narrative rule (not shown) establishes a narrative framework for communications with a customer based on an application area of the visual interface system 100 shown in FIG. 1. In an example, in a drive-through restaurant, the narrative framework may include a greeting, presentation of a menu, discussion of special offers, receiving an order, advising on waiting time for the order, advising of cost and requesting payment etc. The Interface Configuration Module 226 may further include visual interface configuration rules which prescribe appearance attributes of a visual user interface to be displayed to a user. For example, the visual interface configuration rules may include the logo or a color palette of a given vendor. Alternatively, the visual interface configuration rules may include appearance attributes of a human persona, henceforth known as an avatar, for communication with the customer.

The Messaging Module 224 is configured to display a visual user interface on the screen system 102 at the specified display co-ordinates, where the appearance of the visual user interface may be established according to the visual interface configuration rules. The Messaging Module 224 is further configured to co-ordinate communications with a customer based on the narrative rules. The Messaging Module 224 may be further configured to activate one or more speakers (not shown) at a location within a pre-defined distance of the target location. Alternatively or additionally, the Messaging Module 224 may be adapted to use the antenna (not shown) in the communications unit 106 to allow the Messaging Module 224 to communicate with a customer through the customer's own cell phone or other wireless device. The audio communications with the customer may be conducted in accordance with the narrative rule(s) from the Interface Configuration Module 226. the Messaging Module 224 may be further configured to cause the contents of the menu to be displayed to a customer (not shown) on the screen system 102 or recited to the customer (not shown) through the speaker(s) (not shown) or through the customer's own cell phone or other wireless device.

In a further embodiment, the Client Engagement Module 208 may further include a customer recognition module (not shown) which employs one or more optical character recognition (OCR) algorithms to detect and read the characters of a registration number plate of a customer's vehicle from video footage captured by one or more video camera members of the sensor system 104. The Client Engagement Module 208 may further comprise a database (not shown) of registration number details of previously detected customer vehicles. The database may also include details of the customer (not shown) who previously ordered items from the corresponding vehicle. The client recognition module (not shown) may be adapted to interrogate the database to compare the detected registration number details of an incoming customer vehicle with those in the database. In the event a match is found, indicating that the customer is a repeat/re-identified customer, the Client Engagement Module 208 may be configured to adapt the narrative rules employed by the Messaging Module 224 to display on the visual user interface, customized greetings/instructions including the name of the customer, so that the customer is greeted by name.

The Order Taking Module 210 is configured to operate the communications unit 106 shown in FIG. 1 to receive an order from a customer (not shown). To this end, the Order Taking Module 210 is configured to receive audio signals (corresponding with customer utterances) from the microphone (not shown) in the communications unit 106 or from the customer's own cell phone or other wireless device, by way of the antenna unit in the communications unit 106. The Order Taking Module 210 includes speech recognition and language processing algorithms 230 to recognize and comprehend utterances and instructions from the customer (not shown) in the received audio signals. Examples of suitable speech recognition algorithms include hidden Markov modelling, dynamic time warping (DTW) based speech recognition methods and deep neural networks and denoising autoencoders. The skilled person will understand that the preferred embodiment is not limited to these speech recognition algorithms. On the contrary, these examples of algorithms are provided for illustration purposes only. In particular, the skilled person will understand that the preferred embodiment is operable with any speech recognition and language processing algorithm which permits the Order Taking Module 210 to recognize and comprehend audible utterances and instructions from the customer. In an embodiment of the present disclosure, the Order Taking Module 210 is configured to automatically place an order for the user based on the recognized user speech and gestures.

The Order Taking Module 210 is further configured to receive and fuse video footage of customer gestures from the video camera members of the sensor system 104. The Order Taking Module 210 further includes gesture recognition algorithms 232 to recognize and comprehend gestures from the customer in the received video footage. Examples of suitable gesture recognition algorithms include skeletal-based algorithms and appearance-based algorithms. The skilled person will understand that the preferred embodiment is not limited to these gesture recognition algorithms. On the contrary, these examples of algorithms are provided for illustration purposes only. In particular, the skilled person will understand that the preferred embodiment is operable with any gesture recognition algorithm which permits the Order Taking Module 210 to recognize gestural instructions from the customer (not shown).

Thus, the Order Taking Module 210 uses speech recognition, language processing algorithms and/or gesture recognition algorithms to receive an order (e.g. food order in the drive-through restaurant example) from the customer, and communicate information regarding the customer's order to the Transaction Co-ordination Engine 202. For brevity, the information regarding the customer's order will be referred to henceforth as Customer Order Information.

Upon receipt of Customer Order Information, the Transaction Co-ordination Engine 202 is configured to issue a payment triggering signal to the Billing/Payment Module 212. Upon receipt of the payment triggering signal, the Billing/Payment Module 212 is activated to calculate a total bill for the ordered items. The Billing/Payment Module 212 is further activated together with the Messaging Module 224 to operate the communications unit 106 to advise the customer of the total bill and also to request the customer to present their payment card or one or more radio-frequency or near field communication enabled payment devices (e.g. smart fobs, smart cards, cell phones or other wireless devices)) to the payment unit 112 shown in FIG. 1. The Billing/Payment Module 212 is further activated together with the Messaging Module 224 to operate the payment unit 112 to receive payment from the customer (not shown) through their payment card or other radio-frequency or near field communication enabled payment device.

Upon receipt of confirmation of payment from the Billing/Payment Module 212, the Transaction Co-ordination Engine 202 is adapted to transmit the Customer Order Information to the Backend Co-ordination Engine 214 which co-ordinates communications regarding received customer orders with a backend operational function (not shown). In addition to issuing Customer Order Information to the backend operational function (not shown), the Backend Co-ordination Engine 214 may be configured to receive corresponding customer communications from the backend operational function (not shown). Said customer communications may include updates on waiting times or details of a pick-up zone from which the customer (not shown) may retrieve their order. The Backend Co-ordination Engine 214 is further configured to transmit these client communications to the Transaction Co-ordination Engine 202 for forwarding to the Messaging Module 224.

Figure 3:
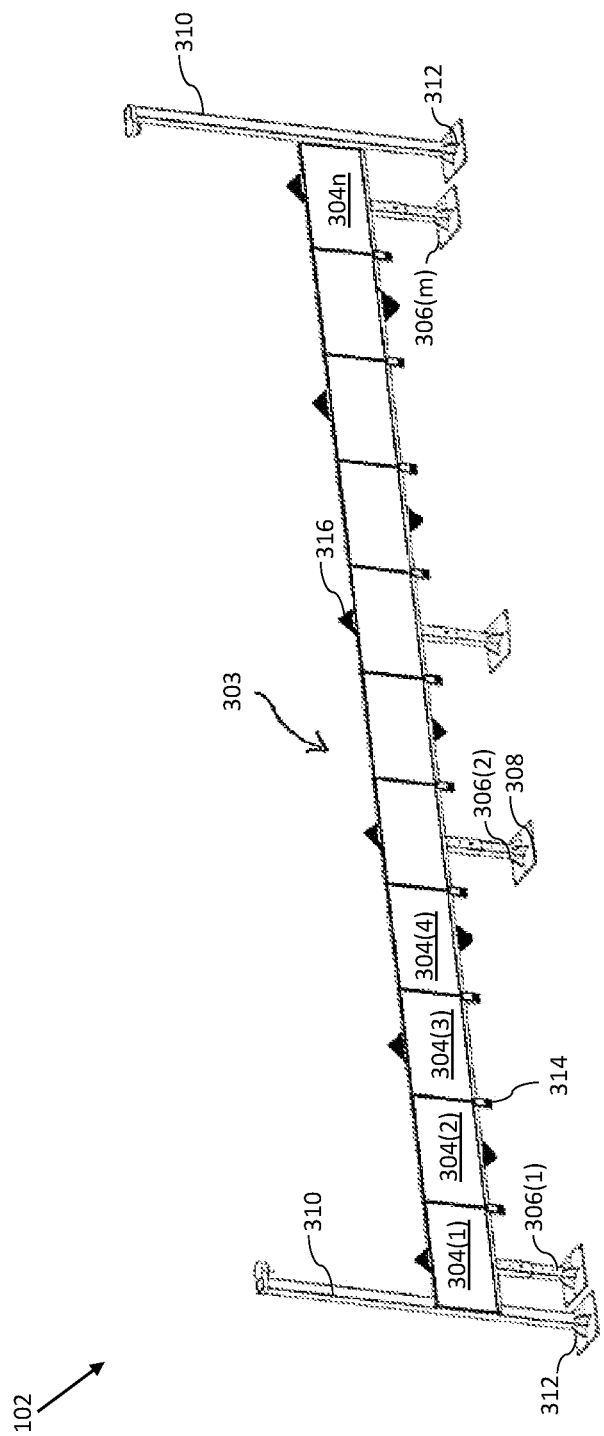
FIG. 3 illustrates a perspective view of an exemplary screen system of the Visual Interface System in a drive-through restaurant, in accordance with an embodiment of the present disclosure.

FIG. 3 illustrates a perspective view of an exemplary screen system 102 of the Visual Interface System 100 shown in FIG. 1 in a drive-through restaurant.

The screen system 102 is formed of a railing system 303 in which first through nth display screens 304(1)-304(n) are mounted thereon. The railing system 303 includes first through mth upright members 306(1)-306(m) of substantially the same length, and disposed in a substantially co-linear spaced apart arrangement. Each of the upright members 306(1)-306(m) is mountable on a corresponding mounting plate 308. The railing system 303 further includes an elongate crossbar member (not shown) for mounting on a top end of at least some of the upright members to straddle the distance between a first peripheral upright member and its opposing peripheral upright member. The crossbar member (not shown) includes at least one central channel (not shown) formed therein, extending along the longitudinal axis of the crossbar member (not shown). The channel (not shown) is adapted to house a corresponding support member (not shown) protruding from a reverse face of a display screen. In use, the mounting plate(s) 308 are fixed to the ground and the first through nth display screens 304(1)-304(n) are mounted in series on the railing system 303 at substantially the same elevation relative to the ground, by the sliding of the support member (not shown) of each display screen in turn into the channel (not shown) of the crossbar member (not shown).

While the present railing system 303 is shown as comprising a single crossbar member (not shown) adapted to support a single linear arrangement of the display screens 304(1)-304(n), the skilled person will understand that this configuration of display screens 304(1)-304(n) is provided for example purposes only. In particular, the skilled person will understand that the present embodiment is not limited to this configuration of display screens 304(1)-304(n). On the contrary, the present embodiment is operable with any configuration of display screens 304(1)-304(n), sufficient to display visual user interfaces at a variety of elevations and positions to accommodate the diversity of vehicle dimensions that may be encountered in a drive through facility and/or to accommodate the display requirements of the operators of the drive through facility. For example, the present railing system 303 may include a plurality of vertically spaced apart crossbar members (not shown) arranged to support a two-dimensional grid-like arrangement of display screens 304(1)-304(n), to enable the display of larger advertisements to a passer-by, together with visual user interfaces to the occupants of customer vehicles in the drive-through restaurant facility.

Similarly, while the above discussion has described the mounting of display screens 304(1)-304(n) on the railing system 303, the skilled person will understand that the preferred embodiment is not limited to this mechanism of positioning and supporting the display screens 304(1)-304(n). On the contrary, the preferred embodiment is operable with any mechanism of positioning and supporting the or each of the display screens 304(1)-304(n). Specifically, the or each of the display screens 304(1)-304(n) may be mountable directly on one or more walls that face an observed area. Alternatively and additionally, individual members of the or each of the display screens 304(1)-304(n) may be mountable on free-standing support members such as stands or tripods or the like.

The railing system 303 may further include a plurality of elongate camera support members 310 that are of greater length than the upright members 306(1)-306(m). A bottom end of each camera support member 310 may be mounted on a corresponding mounting plate 312. In use, the mounting plates 312 are fixed to the ground at pre-defined distances from the outer edges of the collective assembly of display screens 304(1)-304(n), and the camera support members 310 are arranged as uprights from the mounting plates 312. In use, a video camera (not shown) is mountable on the top end of a camera support member 310 to establish a good vantage point over the screen system 302, and the users of the screen system 302. Further video cameras (not shown) may be mounted in spaced apart arrangements on the top of the display screens 304(1)-304(n). Furthermore video cameras (not shown) may be disposed in a front facing arrangement extending from the front of the display screens 304(1)-304(n), to thereby deliver a Field of View which embraces objects (or parts thereof) facing the front of the display screens 304(1)-304(n). For example, each such further video camera may be mounted in a substantially central position on an upper end of a display screen and arranged so that their Field of View extends forward from a front of corresponding display screen. The number and spacing of such further video cameras (not shown) may be configured according to the requirements of the operator. However, preferably, sufficient number of video cameras (not shown) are arranged to provide a substantially seamless view of the area in front of the display screens 304(1)-304(n).

In an embodiment of the present disclosure, a plurality of card reader device(s) 314 are mounted in a spaced apart arrangement at a central position along the length of a bottom end of a front face of the display screens 304(1)-304(n), such that each display screen is provided with a corresponding card reader device. In one embodiment, the card reader devices 314 may be arranged substantially equidistantly along the length of the railing system 303 or the length embraced by the collective assembly of display screens 304(1)-304(n). In particular, the card reader devices 314 may be mounted at a central position along the length of a bottom end of a front face of the bottom display screens, in the event of a grid formation of the display screens. In another embodiment of the present disclosure, the card reader devices 314 may be arranged to substantially hang from the bottom ends of the display screens 304(1)-304(n) or the bottom display screens in the event of a grid formation of the display screens.

In an example, the card reader device 314 may include any one of a magnetic stripe payment card reader unit, a contactless card reader unit, a combined magnetic stripe payment card reader and contactless cart reader unit and any radio-frequency or near field communication enabled reader devices (e.g. radio frequency tag reader or a near field tag reader capable of reading smart fobs, smart cards, cell phones or other wireless devices to receive payment therefrom). In another embodiment, the radio-frequency or near field communication enabled reader may be mounted on a reverse face of at least some of the display screens 304(1)-304(n).

In a further embodiment of the present disclosure, a plurality of microphones 316 are mounted in a spaced apart arrangement on top and bottoms ends of the display screens 304(1)-304(n). In another embodiment, each microphone 316 is mounted at a central position along the length of a bottom end of a front face of each of the display screens 304(1)-304(n) or the bottom display screens in the event of a grid formation of the display screens. In another embodiment, each microphone 316 is mounted at a central position along the length of a top end of a front face of each of the display screens 304(1)-304(n) or the top display screens in the event of a grid formation of the display screens. In yet another embodiment, the microphones 316 are mounted on alternating top and bottom ends of adjacent display screens 304(1)-304(n). In another embodiment, the microphones 316 may be arranged in a spaced apart arrangement with a longitudinal distance of no more than 1 metre between successive microphones 316.

In an example, the microphones 316 may include condenser microphones or shotgun microphones. Further, the microphones 316 may be provided with a windshield to protect against noise from wind sources. Preferably, the microphones have a hypercardioid polar pattern wherein the microphone is most sensitive to on-axis sounds (i.e. where the microphone is pointed), with null points at 110° and 250° and a rear lobe of sensitivity. Furthermore, in view of the long distances between successive microphones 316, the microphones 316 preferably have an X Connector, Locking Connector, Rubber Boot (XLR) output rather than a USB output. Similarly, at least some of the XLR microphones 316 may be connected to an audio interface (not shown) capable of providing at least 48V of phantom power (necessary for the amplification of the microphone signal). The output of the audio interface may be transmitted to a Digital Signal Processing (DSP) unit (not shown) which is adapted to implement at least some of a plurality of signal enhancement techniques to enhance the quality of a received audio signal corresponding with a detected utterance of a customer (not shown). Specifically, the signal enhancement techniques include noise filtering, noise suppression, noise gating, dynamic gain control, compression, equalization and limitation.

Figure 4B:
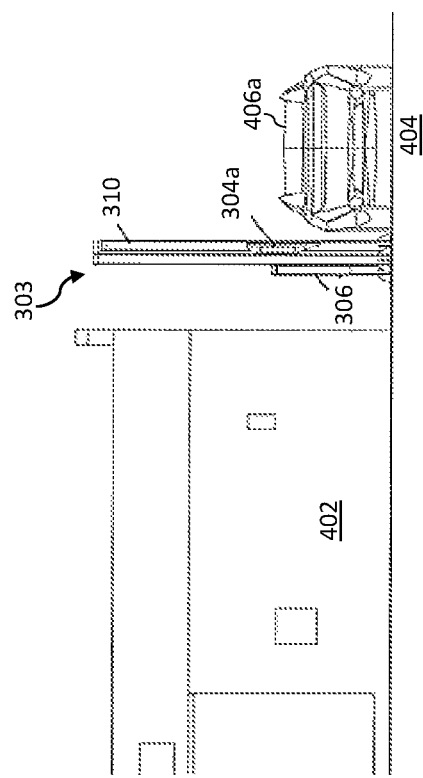
FIGS. 4A and 4B illustrate perspective and front elevation views of the Visual Interface System in the drive-through restaurant use case scenario, in accordance with an embodiment of the present disclosure.
Figure 4A:
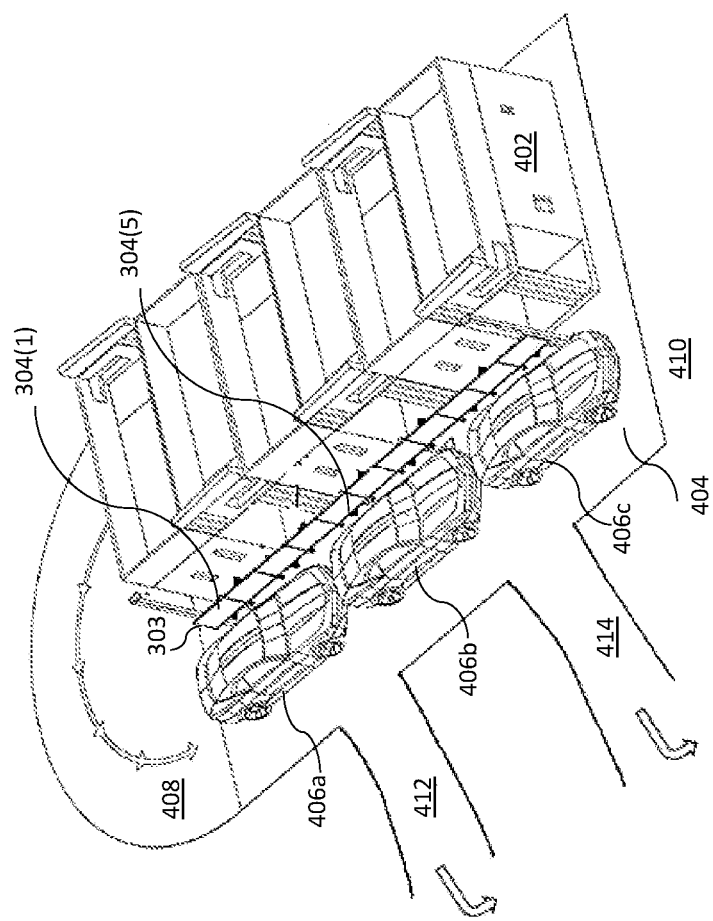

FIGS. 4A and 4B illustrate perspective and front elevation views of the Visual Interface System 100 in the Drive-Through Restaurant Use Case Scenario, in accordance with an embodiment of the present disclosure.

In operation, the railing system 303 of the Visual Interface System 100 shown in FIG. 1 is mounted on or alongside the external walls of a kiosk 402 of a drive-through restaurant facility. Specifically, the railing system 303 is mounted on or alongside the external walls that face a road 404 which at least partly encircles the kiosk 402. The railing system 303 includes multiple display screens 304(1)-304(n) that are arranged so that the front face of the display screen(s) face out towards the road 404. The skilled person will understand that configuration of the road 404 described above and depicted herein is for example purposes only. In particular, the road 404 may only extend along one external wall of the kiosk 402.

The skilled person will understand that the preferred embodiment is not limited to the use of a railing system 303 to support the display screens 304(1)-304(n). On the contrary, the preferred embodiment is operable with any mechanism of positioning and supporting the or each of the display screens 304(1)-304(n) at a required location in the drive-through restaurant facility. Specifically, the or each of the display screens 304(1)-304(n). may be mountable directly on the external walls that face a road 404. Alternatively and additionally, individual members of the or each of the display screens 304(1)-304(n) may be mountable on free-standing support members such as stands or tripods or the like.

Figure 5:
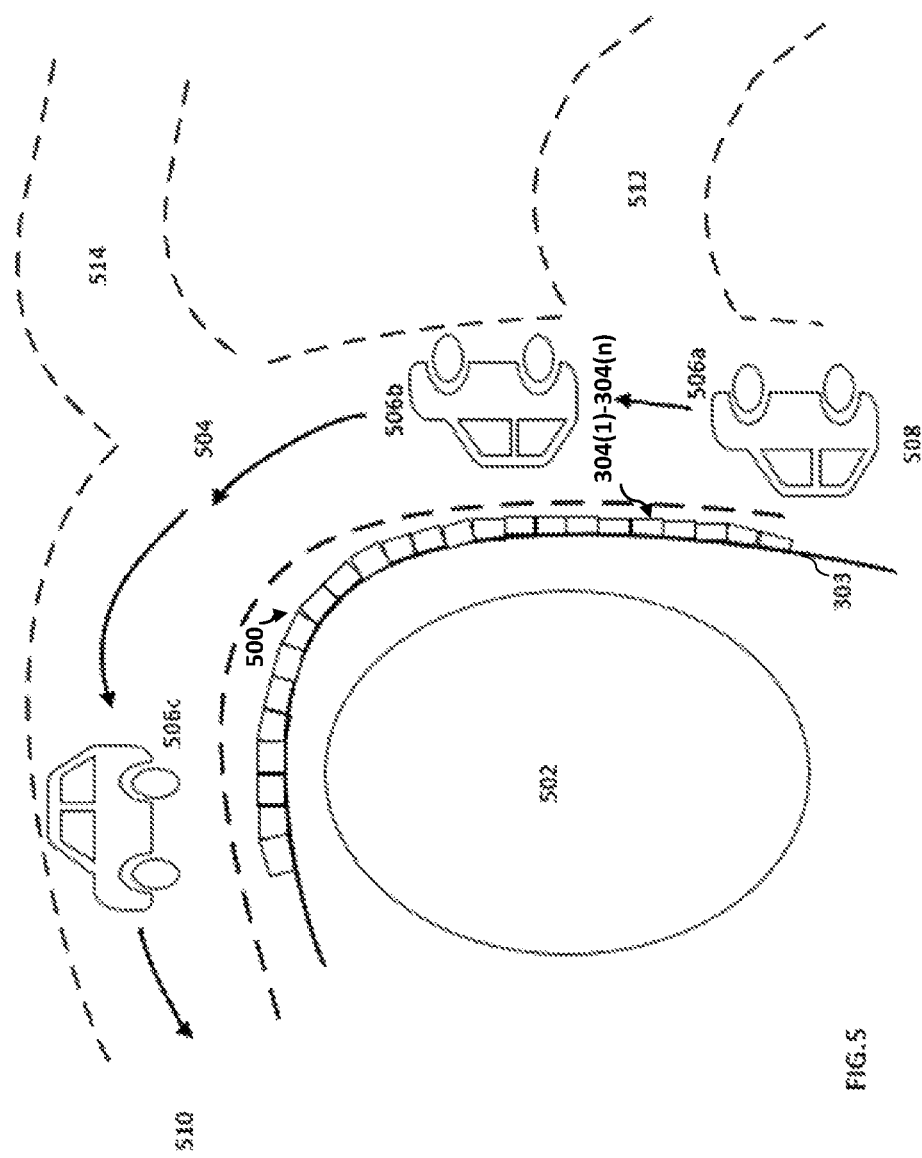
FIG. 5 is a schematic plan view of the Visual Interface System, in accordance with an embodiment of the present disclosure in a drive-through restaurant use case scenario with an arcuate arrangement of a railing system and display screens mounted thereon.

FIG. 5 is a schematic plan view of the Visual Interface System 500, in accordance with an embodiment of the present disclosure in a drive-through restaurant use case scenario with an arcuate arrangement of a railing system 303 and display screens 304(1)-304(n) mounted thereon.

Alternatively and/or additionally, the or each external wall and the road 504 may be curved. In this case, the railing system 303 may be arcuate or serpentine in shape and configured to follow the curved external wall. To achieve this, a balance must be achieved between the requirement for the radius of curvature of an arcuate/serpentine railing system 303 to be sufficiently small to accommodate the smallest radius of curvature of the external wall; and the physical limitations imposed by the dimensions and curvature, if any, of the display screens 304a-304 mounted on the railing system 303.

Referring to FIGS. 4A, 4B and 5, in use, first through third customer vehicles 406a/506a, 406b/506b and 406c/506c may be driven along the road 404/504 from an entry point 408/508 to an exit point 410/510 of the drive-through restaurant facility. The road 404/504 may be provided with a plurality of spaced apart side-exit routes 412/512 and 414/514 between the entry and exit points 408/508 and 410/510. The spaced apart side-exit routes 412/512 and 414/514 may direct vehicles to one or more order pickup points (not shown), from which customers may retrieve their ordered items.

Referring to FIGS. 2, 4A and 4B together, upon entry of a customer vehicle such as the second customer vehicle 406b to the road 404, the location of the second customer vehicle 406b relative to each end of the railing system 303 may be detected by the Detector Unit 204 from video footage captured by one or more video cameras (not shown) mounted on upright camera support members 310 and/or by further video cameras installed at different locations in the drive-through restaurant facility. As the second customer vehicle 406b is driven along the road 404, the location of the second customer vehicle 406b (and corresponding movements thereof) is tracked by the Detector Unit 204 from video footage captured by one or more video cameras (not shown) mounted on the tops of the display screens of the railing system 303.

Figure 6:
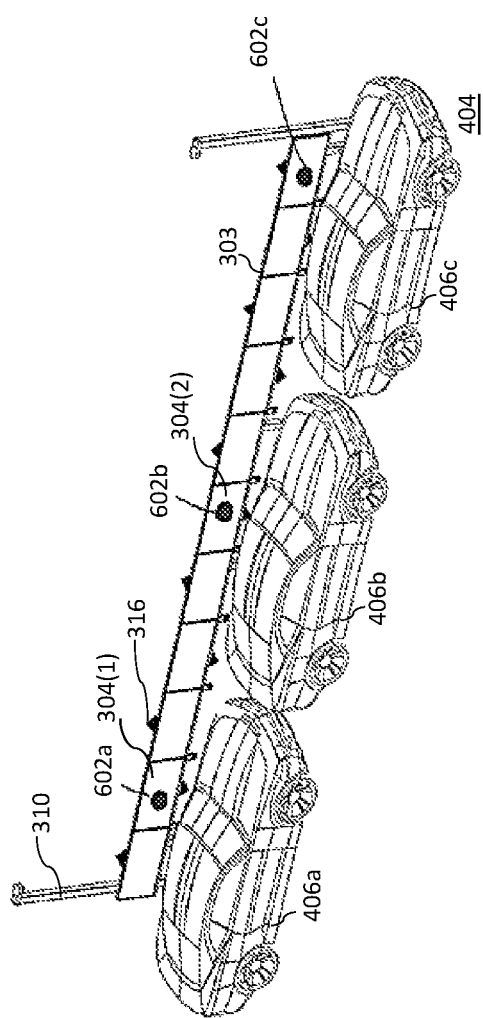
FIG. 6 illustrates a perspective view of the Visual Interface System in the Drive-Through Restaurant use case scenario of FIG. 4A, with the kiosk and encircling road removed for the ease of viewing, in accordance with an embodiment of the present disclosure.

FIG. 6 illustrates a perspective view of the Visual Interface System in the Drive-Through Restaurant use case scenario of FIG. 4A, with the kiosk and encircling road removed for the ease of viewing.

The first through third customer vehicles 406a, 406b and 406c may be driven along the road 404 of the drive-through restaurant facility. Upon entry of a customer vehicle such as the second customer vehicle 406b on the road 404, the location of the second customer vehicle 406b relative to each end of the railing system 303 may be detected. The railing system 303 includes the first through nth display screens 304(1)-304(n) mounted thereon using support members 310. The first and second display screens 304(1) and 304(2) display first and second visual user interfaces 602a and 602b.

The Interface Movement Controller 206 translates the detected location of a customer vehicle such as the second customer vehicle 406b into an identifier of the second display screen 304(2) disposed closest to the second customer vehicle 406b. The Interface Movement Controller 206 further translates the detected location of the second customer vehicle 406b into the co-ordinates of a display position on the second display screen 304(2), wherein the said co-ordinates correspond with a location on the second display screen 304(2) that is within a pre-defined distance of a driver's window or front passenger's window of the second customer vehicle 406b. For brevity, the co-ordinates corresponding with a location on the second display screen 304(2) that is located within a pre-defined distance of a driver's window or front passenger's window of the second customer vehicle 406b, will be referred to henceforth as a Target Activation Position.

The Messaging Module 224 causes a visual user interface 602b to be displayed at the Target Activation Position. Alternatively, the Messaging Module 224 may cause the visual user interface 602b to be moved to the Target Activation Position from a starting position on the second display screen 304(2). Accordingly, the visual user interface 602b is displayed to the occupants of the second customer vehicle 406b being driven and/or queued on the road 404. Furthermore, the Interface Movement Controller 206 and the Messaging Module 224 cause the visual user interface 602b to effectively follow the movements of the second customer vehicle 406b and match the tracked location of the second customer vehicle 406b as it moves along the road 404. Thus, the visual user interface 602b may be displayed on other display screens to match the location of second customer vehicle 406b.

The visual user interface 602b may include a menu from which the occupants of the second customer vehicle 406b may select food items. Alternatively, the visual user interface 602b may detail special offers which the occupants of the second customer vehicle 406b are invited to select. In another embodiment, the visual user interface 602b may be customized according to a known transaction history associated with a recognized customer vehicle or a recognized customer in the second customer vehicle 406b. The Messaging Module 224 may also activate one or more speakers (not shown) located within a pre-defined distance of the detected location of the second customer vehicle 406b to facilitate an audio message to the occupants of the corresponding customer vehicle 406b. In the event, the second display screen 304(2) is a touchscreen, the occupants of the second customer vehicle 406b may be invited to select items from the visual user interface 602b by pressing a location on corresponding display screen. The selection corresponding with the pressed location is received by the Order Taking Module 210.

In another embodiment of the present disclosure, the occupants of the second customer vehicle 406b may be invited to select an item from the visual user interface 602b by speaking aloud a name or other identifier of the item. To avoid errors arising from mistaken detection of audio signals from other nearby customers/customer vehicles, a microphone 316 located closest to the detected location of the second customer vehicle 406b is activated to receive audio signals corresponding with the customer's utterances. For brevity, the microphone 316 located closest to the detected location of the second customer vehicle 406b will be referred to as the Target Microphone Position. To further reduce the risk of crossed communications, the microphones 316 located on either side of the Target Microphone Position and within a pre-defined distance of the Target Microphone Position are deactivated. In addition, one or more features based on the time and frequency domain characteristics of the detected audio signals are examined to enhance the quality of the signal(s) received from the microphone at the Target Microphone Position. The examined features are independent of the signal amplitude. Thus, the examined features are unaffected by variations in the diction loudness of individual customers and individual microphone setup. Alternatively, the audio signals may be received from the customer's own cell phone or other wireless device (by way of the antenna unit in the communications unit 106). The order taking module 210 processes the audio signals received from the microphone 316 mounted on the display screen(s) or from the customer's own cell phone or other wireless device, using speech recognition and language processing algorithms 230 to recognize selections made by the customer and/or other instructions from the customer.

In yet another embodiment of the present disclosure, the occupants of the second customer vehicle 406b may be invited to select an item from the visual user interface 602b by making appropriate gestures towards the displayed required items. In this case, the video footage captured by video camera(s) mounted on the upright camera support members 310 or on the top edges of the display screens 304(1)-304(n) is processed using gesture recognition algorithms 232 to detect and recognize gestures from the customer (not shown) and thereby receive the customer's order.

Upon receipt of the customer's selection, the Billing/Payment Module 212 calculates the bill for the selected food items; and requests the customer (not shown) for payment of the bill. The customer (not shown) is requested to present their magnetic stripe card or contactless payment means to the nearest card reader to make payment for the bill. In another embodiment of the present disclosure, the Billing/Payment Module 212 displays a QR code to a customer on the visual user interface 602b. The QR code comprises an embedded link to the Billing/Payment Module 212 which may be accessed by the customer's wireless device to enable payment to be made from the wireless device.

Upon receipt of payment, the Backend Co-ordination Engine 214 transmits the received customer order to a back-end operation (not shown) with instructions to fulfill the customer order. The visual user interface 602b may also be activated to provide directions to an order pickup point (not shown) at which the customer may collect their order. For example, the driver may be directed to veer the second customer vehicle 406b away from the road 404 onto the nearest appropriate side roads 412 and 414 (see, FIG. 4) to reach the order pickup point (not shown). Alternatively, or additionally, the visual user interface 602b may also be activated to display advertisements or entertaining videos to the customers as they wait for their order to be completed.

Alternatively, or additionally, the visual user interface 602b may demonstrate product samples to a waiting customer and thereafter conduct a brief survey on the product sample just demonstrated. This enables the real time collection and analysis of the results of customer surveys, to support detailed demographic and geographic variables in assessing the likelihood of a trial product's future success. Indeed, the user interface system enables a retailer to work with its consumer product goods partners to modify both how, when and why promotional and other marketing tactics and strategies are deployed.

Upon departure of the second customer vehicle 406b from a queue alongside the railing system 300, the visual user interface 602b associated with the second customer vehicle 406b will be deactivated. When the second customer vehicle 406b departs, then the visual user interface 602a associated with the first customer vehicle 406a behind the departing second customer vehicle 406b will follow the first customer vehicle 406a as it moves to close the gap formed by the departing customer vehicle 406b. Additionally, a new visual user interface will be activated for a detected newly incoming customer vehicle 406a.

In this manner, the challenges caused by a misalignment of the physical sequencing of customer engagement devices on a shared rail with variable duration order-taking processes with an individual customer is avoided. Specifically, service to individual customers in a queue is no longer limited by the speed of taking the slowest or most complex order. Instead, customers with shorter/simpler orders may have their order taken quickly without a dependency on the speed of order-taking from customers further ahead of them in the queue. Similarly, the visual user interface of the present embodiment enables spatially independent and effectively cellular order-taking processes to be taken without the physical sequencing constraints imposed by a shared mechanical rail system.

Figure 7:
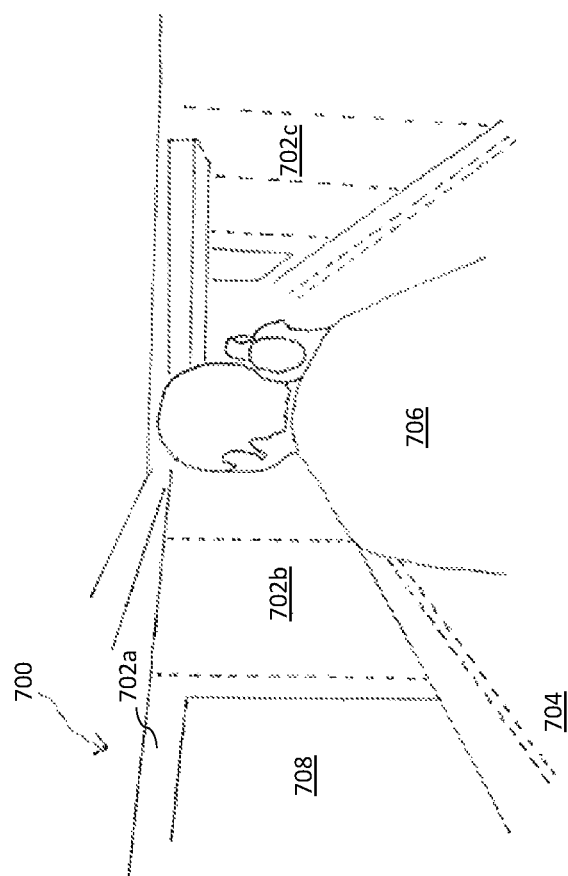
FIG. 7 is a perspective view of a Visual Interface System implemented beside a moving walkway exemplary use case scenario, in accordance with an embodiment of the present disclosure.

FIG. 7 is a perspective view of a Visual Interface System 700 (similar to the visual interface system 100) implemented beside a moving walkway exemplary use case scenario.

The visual interface system 700 includes first, second and third display screens 702a, 702b, and 702c (hereinafter collectively referred to as display screens 702) mounted on a side wall located within a pre-defined distance of a side of a moving walkway 704, such as a travelator 704. In one embodiment, the display screens 702 may be mounted on either side of the travelator 704. Upon detecting the presence of a person 706 on the travelator 704, the Visual Interface System 700 detects the location of the person 706 relative to the display screens 702.

The Visual Interface System 700 then translates the detected location of the person into display co-ordinates onto the first display screen 702a closest to the person 706. The display co-ordinates represent a position closest to the person 706 on the first display screen 702a. The Visual Interface System 700 displays a visual user interface 708 centered at the co-ordinates on the first display screen 702a. The visual user interface 708 may include information for visitors, advertisements or entertainment videos. The Visual Interface System 700 tracks the movement of the person 706 on the travelator 704 and causes the position of the visual user interface 708 to be moved to follow the movements of the person 706. In this way, the visual user interface 708 moves along the longitudinal axis of the first display screen 702a at a speed that substantially matches the speed of movement of the person 706. For example, in the event the person 706 stands still on the walkway 704, the visual user interface 708 moves along the longitudinal axis of the first display screen 702a at substantially the same speed as the travelator 704 moves.

Figure 8:
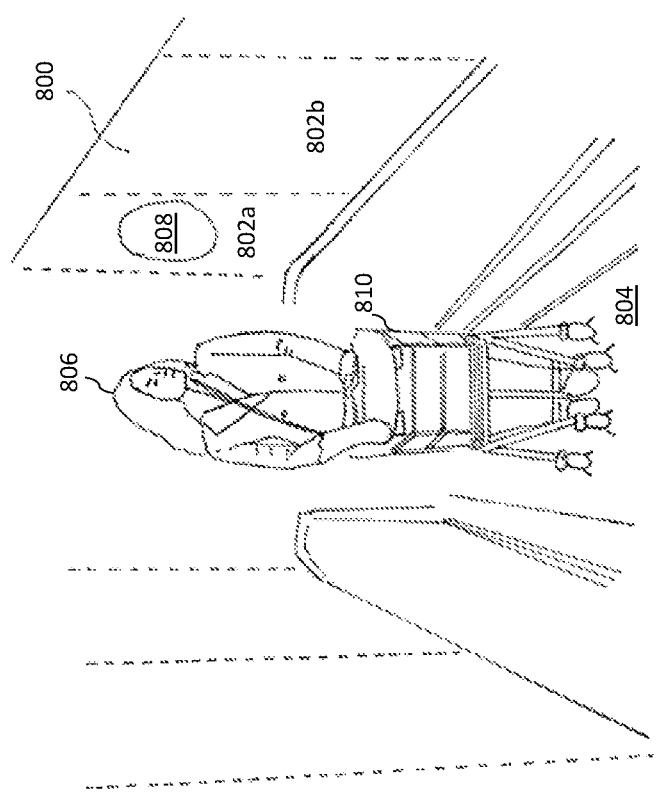
FIG. 8 is a perspective view of the Visual Interface System implemented besides a moving walkway or escalator, in accordance with an embodiment of the present disclosure.

FIG. 8 is a perspective view of the Visual Interface System 800 (similar to the visual interface system 100) implemented besides a moving walkway or escalator, in accordance with an embodiment of the present disclosure.

Supermarkets and airports often have inclined walkways 804 to bring a customer 806 from one floor to another. The wheels of a shopping cart 810 or suitcase lock into the walkway 804 and constrain the customer 806 from moving faster than the speed of the walkway 804. In a preferred embodiment, the Visual Interface System 800 includes one or more display screens 802a and 802b mounted on a side wall located within a pre-defined distance of a side of the escalator/moving walkway 804. In one embodiment, the display screens 802a, 802b may be mounted on either side of the escalator/moving walkway 804. Upon detecting the presence of a person 806 on the escalator/moving walkway 804, the Visual Interface System 800 detects the location of the person 806 relative to the display screen(s) 802a, 802b. The Visual Interface System 800 translates the detected location of the person into display co-ordinates on the first display screen 802a closest to the person 806. The display co-ordinates represent a position closest to the person 806 on the first display screen 802a. The Visual Interface System 800 displays a visual user interface 808 centered at the co-ordinates on the first display screen 802a. The visual user interface 808 may include an entertaining video or a peaceful image to distract the person 806 from the annoyance of their constrained movement on the escalator/moving walkway 804. Alternatively, or additionally, the visual user interface 808 may include advertising promotions or informational videos.

The Visual Interface System 800 tracks the movement of the person 806 on the escalator/moving walkway 804 and causes the position of the visual user interface 808 to be moved to follow the movements of the person 806. In this way, the visual user interface 808 moves along the longitudinal axis of the first display screen 802a at a speed that substantially matches the speed of movement of the escalator/moving walkway 804. For example, in the event the person 806 stands still on the walkway 804, the visual user interface 808 moves along the longitudinal axis of the first display screen 802a at substantially the same speed as the travelator 804 moves.

Figure 9:
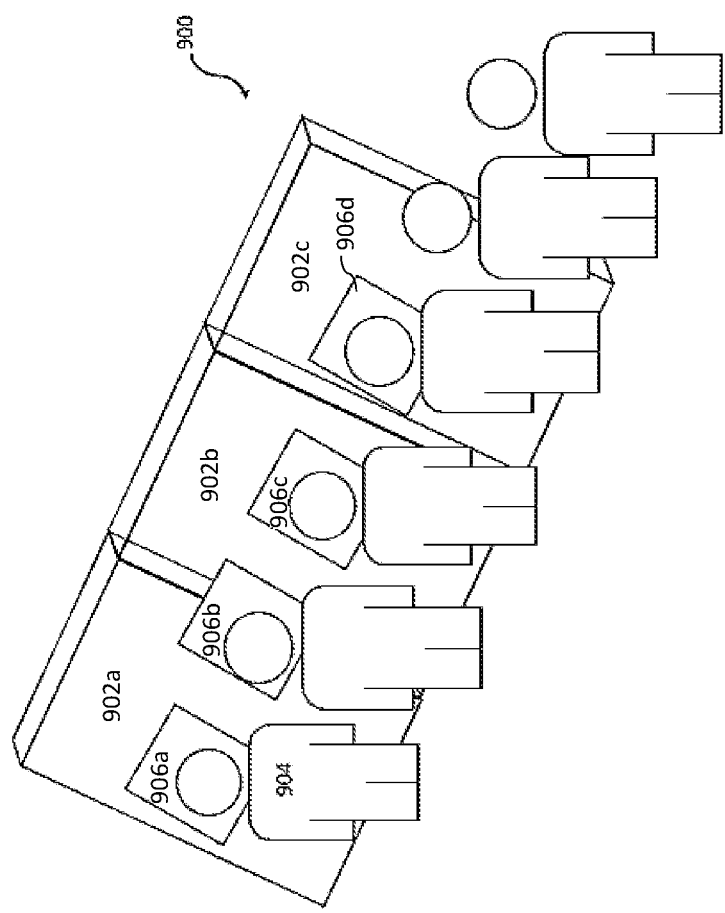
FIG. 9 is a schematic perspective view of a first wall-based use case scenario of the Visual Interface System, in accordance with an embodiment of the present disclosure.

FIG. 9 is a schematic perspective view of a first wall-based use case scenario of the Visual Interface System, in accordance with an embodiment of the present disclosure.

In a first wall-based use case scenario, the Visual Interface System 900 comprises first through third display screens 902a-902c mounted in sequence on a wall (not shown) parallel to which one or more people are allowed to queue, wherein an interaction region of the Visual Interface System is formed in an area in front of the wall and display screens 902a-902c where people are allowed to queue. In use, on detecting the approach of a person 904 in a queue to one or more of the display screen(s) 902a-902c, the Visual Interface System 900 detects the location of the person 904 relative to the or each of the display screen(s) 902a-902c. The Visual Interface System 900 translates the detected location of the person 904 into co-ordinates on the display screen 902a-902c closest to the person 904. The co-ordinates represent a position closest to the person 904 on the display screen 902a-902c. The Visual Interface System 900 displays first through fourth visual user interfaces 906a-906d centered at the co-ordinates on the first through third display screens 902a-902c.

The first through fourth visual user interfaces 906a-906d may include information, advertisements or an interface to a booking facility. For example, the visual user interface 906 such as the first visual user interface 906a may include an interface to a concert ticket booking system, a movie ticket booking system for use in a cinema, a seat ticket booking system in a sports venue, or a flight or a hotel room booking system or the like. The Visual Interface System 900 tracks the movement of the person 904 as they progress in the queue. The Visual Interface System 900 causes the position of the first visual user interface 906a to be moved to follow the movements of the person 904. In this way, the first visual user interface 906a moves along the longitudinal axis of the first through third display screens 902a-902c at a speed that substantially matches the speed of movement of the person 904 in the queue. Thus, the person may purchase a ticket for a concert, movie, sports event, or a flight or a hotel room while standing in a queue.

Figure 10:
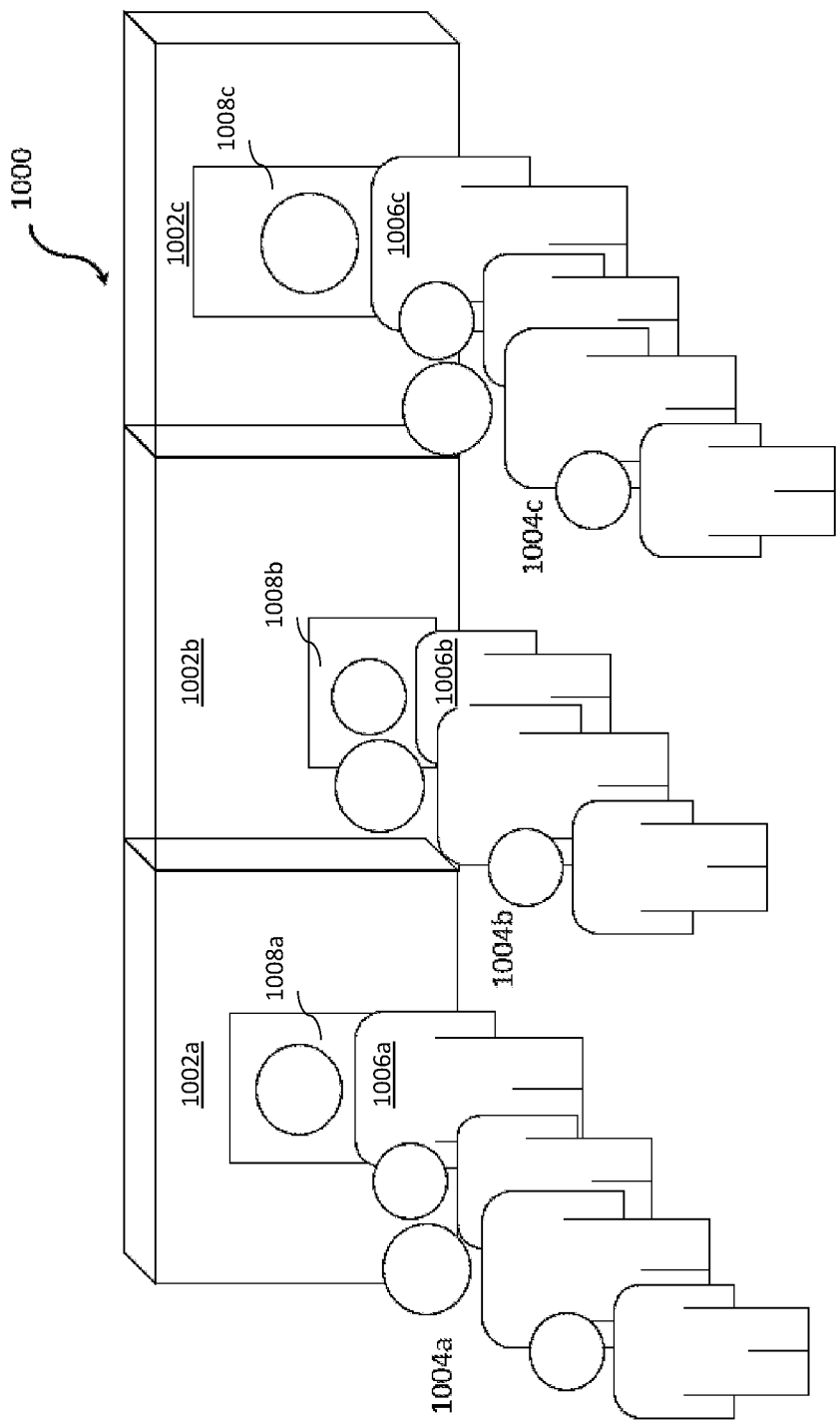
FIG. 10 is a schematic perspective view of a second wall-based use case scenario of the Visual Interface System, in accordance with an embodiment of the present disclosure.

FIG. 10 is a schematic perspective view of a second wall-based use case scenario of the Visual Interface System, in accordance with an embodiment of the present disclosure.

In a second wall-based use case scenario, the Visual Interface System 1000 comprises first through third display screens 1002a-1002c mounted in sequence on a wall (not shown). One or more queues 1004a, 1004b, 1004c of one or more people 1006a-1006c are allowed to form in a substantially perpendicular arrangement relative to the wall (not shown). An interaction region of the user interface system Visual Interface System 1000 is formed in an area in front of the wall and first through third display screens 1002a-1002c where people are allowed to queue.

On detecting the approach of a person 1006a-1006c to one or more of the display screen(s) 1002a-1002c, the Visual Interface System 1000 detects the location of first through third persons 1006a-1006c relative to the or each of the first through third display screens 1002a-1002c. More specifically, bearing in mind that people are of different heights and may adopt different postures (for example, stooping, stretching or bending), the Visual Interface System 1000 detects the location of the person's face relative to the first through third display screens 1002a-1002c.

The Visual Interface System 1000 translates the detected location of the person's face into co-ordinates on the first through third display screens 1002a-1002c closest to the first through third persons 1006a-1006c. The co-ordinates represent a position closest to the person's face on the first through third display screens 1002a-1002c. The Visual Interface System 1000 displays first through third visual user interfaces 1008a-1008c centered at the co-ordinates on the first through third display screens 1002a-1002c respectively.

In this way, the displayed location of the first through third visual user interfaces 1008a-1008c is adaptable to either or both of the height and posture of corresponding person 1006a-1006c using the Visual Interface System 1000. The Visual Interface System 1000 tracks the movement of the person 1006a-1006c in the event they change posture (e.g. bends down to pick up something or to look in a bag etc.). The Visual Interface System 1000 causes the position of the first through third visual user interfaces 1008a-1008c to be moved to follow the movements of the first through third persons 1006a-1006c respectively. In this way, first through third visual user interfaces 1008a-1008c moves along either or both of the vertical axis and the longitudinal axis of the first through third display screens 1002a-1002c at a speed that substantially matches the speed of movement of the first through third persons 1006a-1006c respectively.

The first through third visual user interfaces 1008a-1008c may include information, advertisements or an interface to a booking facility. For example, they may include an interface to a concert ticket booking system, a movie ticket booking system for use in a cinema, a seat ticket booking system in a sports venue, or a flight or a hotel room booking system or the like. Thus, a person such as the first person 1006a may purchase a ticket for a concert, movie, sports event, or a flight or a hotel room. Thus, the first person 1006a may purchase a ticket for a concert, movie, sports event, or a flight or a hotel room while changing their posture and moving in front of the first display screen 1002a. This promotes a more natural interaction of the first person 1006a with the Visual Interface System 1000 in situations where the person's attention is distracted by other or accompanying people, or the need to find something in a bag, or the need of a person to direct their gaze towards a mobile/wireless device and the like.

On completion of the relevant transaction and the departure of the first person 1006a from the first queue 1004a at the first display screen 1002a, the Visual Interface System 1000 detects the next person 1006 in the queue 1004a as they approach the first display screen 1002a and adjusts the displayed location of the first visual user interface 1008a according to either or both of the height and posture of the said next person 1006.

Figure 11:
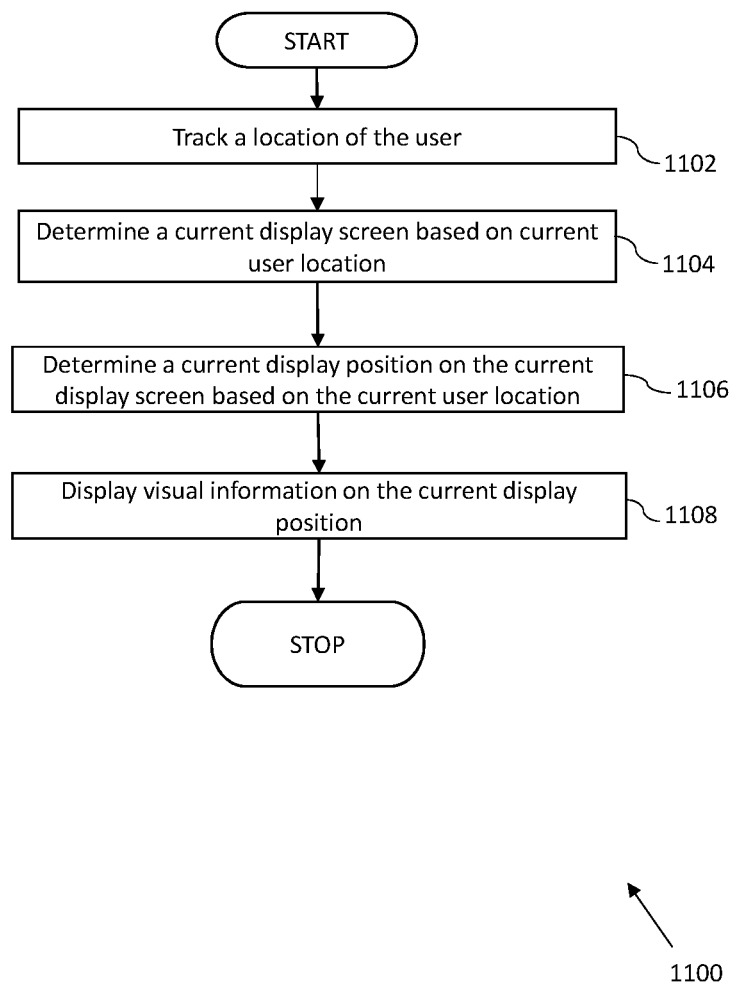
FIG. 11 is a flowchart of a method of displaying visual information to a user, in accordance with an embodiment of the present disclosure.

FIG. 11 is a flowchart of a method of displaying visual information to a user, in accordance with an embodiment of the present disclosure.

At step 1102, a location of the user along a pre-defined path is tracked. When the pre-defined path is a service lane of a drive-through restaurant facility, an entry of the vehicle is detected along the pre-defined path, a location of the detected vehicle is tracked, the detected vehicle is classified in one of the plurality of pre-defined classes, and the location of the user in the detected vehicle is determined based on the classification of the detected vehicle.

At step 1104, a current display screen is determined from a plurality of display screens installed in the pre-defined path, based on a current user location. At step 1106, a current display position on the current display screen is determined based on the current user location, wherein the current display position is at a pre-defined distance from the current user location. In an embodiment of the present disclosure, the current location of the user is translated into an identifier of the current display screen, and display co-ordinates of the display position on the current display screen.

At step 1108, the visual information is displayed on the current display position. In an embodiment of the present disclosure, the visual information is displayed through a visual user interface. The visual user interface may be moved across the plurality of display screens, to follow movement of the user along the pre-defined path. When the pre-defined path is the service lane of a drive-through restaurant facility, the visual user interface issues a greeting to the user, displays a menu, receives an order and corresponding payment, and directs the user to a pick-up point to retrieve the completed order.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A visual interface system, comprising:
a screen system comprising a plurality of display screens installed along, within or upon a pre-defined region;
a sensor system, comprising at least one of: a plurality of video cameras, a plurality of audio sensors, and a plurality of proximity sensors; and
a processing system communicatively coupled to the screen system, and the sensor system, wherein the processing system is configured to:
detect a user in the pre-defined region based on signals received by the sensor system;
track a location of the user within the pre-defined region;
determine a current display screen of the screen system;
determine a current display position on the current display screen based on the current user location, wherein the current display position is at a pre-defined distance from the current user location;
display a visual user interface on the current display position; and
move the visual user interface across the plurality of display screens to follow movement of the user.

2. The visual interface system of claim 1, wherein when the pre-defined region is a service lane of a drive-through restaurant facility, the processing system is further configured to:
detect entry of a vehicle into the pre-defined region;
track a location of the detected vehicle;
classify the detected vehicle in one of a plurality of pre-defined classes;
determine a location of a user in the detected vehicle based on the classification of the detected vehicle;
determine the current display screen based on current location of the user in the detected vehicle; and
display the visual user interface on the current display screen at a display position that is within the pre-defined distance from the user, wherein the visual user interface issues a greeting to the user, displays a menu, receives an order and corresponding payment, and directs the user to a pick-up point to retrieve the completed order, and wherein the visual user interface moves across the plurality of display screens, to follow movement of the detected vehicle.

3. The visual interface system of claim 2, wherein the processor system is further configured to:
recognize a registration number of the detected vehicle;
re-identify the user based on the registration number of the detected vehicle; and display on the visual user interface, customized instructions for the re-identified user.

4. The visual interface system of claim 2, wherein the processing system is further configured to:
recognize at least one of: user speech and user gestures; and
automatically place order for the user based on the recognized user speech and gestures.

5. The visual interface system of claim 1, wherein when the pre-defined region is a moving walkway, the processing system is further configured to move the visual user interface across the plurality of display screens to match a speed of the user.

6. The visual interface system of claim 1, wherein the processing system is further configured to:
display the visual user interface on a first display screen of the plurality of display screens, wherein a display position of the visual user interface on the first display screen is within the pre-defined distance from the user; and
stop display of the visual user interface on the first display screen, and initiate displaying of the visual user interface on a second display screen of the plurality of display screens, when the display position of the visual user interface on the first display screen is outside of the pre-defined distance from the user, and the display position of the visual user interface on the second display screen is within the pre-defined distance from the user.

7. The visual interface of claim 1, wherein the processor is further configured to activate one or more speakers from a plurality of speakers, at a location within the pre-defined distance from the user to provide one or more announcements and instructions to the user.

8. The visual interface system of claim 1, wherein the screen system comprises:
a railing system;
the plurality of display screens mounted on the railing system;
a plurality of card reader devices mounted on the plurality of display screens, wherein each card reader device is mounted at a central position along a length of a bottom end of a front face of corresponding display screen; and
the plurality of audio sensors mounted on the plurality of display screens, wherein each microphone is mounted on at least one of: a top end and a bottom end of corresponding display screen.

9. The visual interface system of claim 8, wherein the plurality of display screens are mounted on the railing system in one of: a linear spaced-apart arrangement and a two-dimensional grid arrangement.

10. A non-transitory computer readable medium configured to store a program causing a computer to display visual information to a user, said program configured to:
detect a user in a pre-defined region based on signals received by the sensor system;
track a location of the user within the pre-defined region;
determine a current display screen of the screen system;
determine a current display position on the current display screen based on the current user location, wherein the current display position is at a pre-defined distance from the current user location;
display a visual user interface on the current display position; and
move the visual user interface across the plurality of display screens to follow movement of the user.

11. A method of displaying visual information to a user, comprising:
detecting the user in a pre-defined region based on signals received from one or more sensors;
tracking a location of the user within the pre-defined region;
determining a current display screen from a plurality of display screens installed along within or upon the pre-defined region, based on a current user location;
determining a current display position on the current display screen based on the current user location, wherein the current display position is at a pre-defined distance from the current user location;
displaying the visual information on the current display position; and
moving the visual information across the plurality of display screens to follow movement of the user, wherein the visual information comprises a visual user interface.

12. The method of claim 11, wherein when the region is a service lane of a drive-through restaurant facility, the method further comprising: detecting entry of a vehicle into the region; tracking a location of the detected vehicle; classifying the detected vehicle in one of a plurality of pre-defined classes; determining a location of a user in the detected vehicle based on the classification of the detected vehicle; determining the current display screen based on a current location of the user in the detected vehicle; and displaying the visual user interface on the current display screen at a display position that is within the pre-defined distance from the user, wherein the visual user interface issues a greeting to the user, displays a menu, receives an order and corresponding payment, and directs the user to a pick-up point to retrieve the completed order, and wherein the visual user interface moves across the plurality of display screens, to follow movement of the detected vehicle.

13. The method of claim 12, further comprising:
translating the current location of the user into an identifier of the current display screen; and
further translating the current location into display co-ordinates of the display position on the current display screen.

14. The method of claim 12, further comprising:
recognizing a registration number of the detected vehicle;
re-identifying the user based on the registration number of the detected vehicle; and
displaying on the visual user interface, customized instructions for the re-identified user.

15. The method of claim 12, further comprising:
recognizing at least one of: user speech and user gestures; and
automatically placing an order for the user based on the recognized user speech and gestures.

16. The method of claim 11, further comprising activating one or more speakers from a plurality of speakers, at a location within the pre-defined distance from the user to provide one or more announcements and instructions to the user.

17. The method of claim 11, wherein when the pre-defined region is a moving walkway, the method further comprises moving the visual user interface across the plurality of display screens to match a speed of the user.

18. The method of claim 11, further comprising: displaying the visual user interface on a first display screen of the plurality of display screens, wherein a display position of the visual user interface on the first display screen is within the pre-defined distance from the user; and stopping display of the visual user interface on the first display screen, and initiate displaying of the visual user interface on a second display screen of the plurality of display screens, when the display position of the visual user interface on the first display screen is outside of the pre-defined distance from the user, and the display position of the visual user interface on the second display screen is within the pre-defined distance from the user.

\* \* \* \* \*